(12) United States Patent
Tantawi et al.

(10) Patent No.: US 12,058,006 B2
(45) Date of Patent: Aug. 6, 2024

(54) RESOURCE TOPOLOGY GENERATION FOR COMPUTER SYSTEMS

(71) Applicant: International Business Machines Corporation, Armonk, NY (US)

(72) Inventors: Asser Nasreldin Tantawi, Somers, NY (US); Ming-Hung Chen, Mount Kisco, NY (US); Pavlos Maniotis, White Plains, NY (US); Claudia Misale, White Plains, NY (US); Laurent Schares, Pleasantville, NY (US); Seetharami R. Seelam, Chappaqua, NY (US); Hao Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/062,203

(22) Filed: Dec. 6, 2022

(65) Prior Publication Data
US 2023/0291655 A1    Sep. 14, 2023

(30) Foreign Application Priority Data
Mar. 8, 2022    (GR) .............................. 20220100639

(51) Int. Cl.
*G06F 15/173*    (2006.01)
*G06F 9/455*    (2018.01)
(Continued)

(52) U.S. Cl.
CPC ........ *H04L 41/122* (2022.05); *G06F 9/45558* (2013.01); *H04L 41/0893* (2013.01)

(58) Field of Classification Search
CPC ... H04L 41/122; H04L 41/0893; H04L 47/70; H04L 47/748; G06F 9/45558
See application file for complete search history.

(56) References Cited

U.S. PATENT DOCUMENTS 7,761,538 B2    7/2010  Lin
8,570,903 B1    10/2013 Artzi et al.
(Continued)

FOREIGN PATENT DOCUMENTS

| CN | 103516733 A | 1/2014 |
|---|---|---|
| CN | 110768837 A | 2/2020 |
| CN | 113193984 A | 7/2021 |

OTHER PUBLICATIONS

Dong H. Ahn et al., "Flux: Overcoming Scheduling Challenges for Exascale Workflows", 2020, Future Generation Computer Systems, 110, 12 pages.
(Continued)

*Primary Examiner* — Joseph R Maniwang
(74) *Attorney, Agent, or Firm* — Stephen R. Yoder

(57) ABSTRACT

Disclosed embodiments provide a virtual topology in response to an allocation request. The virtual topology is a synchronized subgraph of the physical topology. The synchronized subgraph virtual topology mirrors the physical topology in terms of tree structure. However, merely sharing the physical topology with users/customers is not feasible, as it may reveal additional infrastructure details such as MAC addresses, IP addresses, and the like, that can compromise security and/or jeopardize multi-tenant operations. Disclosed embodiments create virtual topology structures with obfuscated node data, so that important data such as physical IP addresses and/or MAC addresses are hidden from the end-users. Thus, disclosed embodiments provide the benefits of performance enhancement that comes from sharing the topology without the downside of compromising security by revealing physical topology details.

15 Claims, 5 Drawing Sheets

(51) Int. Cl.
*H04L 41/0893* (2022.01)
*H04L 41/122* (2022.01)

(56) References Cited

U.S. PATENT DOCUMENTS

| | | | |
|---|---|---|---|
| 8,667,207 B2 | 3/2014 | Knowles | |
| 8,959,523 B2 | 2/2015 | Patil et al. | |
| 8,978,030 B2 | 3/2015 | Malaiyandisamy | |
| 9,298,515 B2 | 3/2016 | McMurry | |
| 9,317,336 B2 | 4/2016 | Alicherry | |
| 9,569,248 B2 | 2/2017 | Apte et al. | |
| 9,582,303 B2 | 2/2017 | Shu et al. | |
| 9,584,594 B2 | 2/2017 | Pell | |
| 9,826,030 B1* | 11/2017 | Dhoolam | H04L 67/1008 |
| 9,864,618 B2 | 1/2018 | Cropper et al. | |
| 9,940,162 B2 | 4/2018 | Harris | |
| 10,395,219 B1 | 8/2019 | Mentz et al. | |
| 10,768,998 B2 | 9/2020 | Aronovich | |
| 10,776,173 B1 | 9/2020 | Greenwood et al. | |
| 10,924,349 B2 | 2/2021 | Shah et al. | |
| 11,094,031 B2 | 8/2021 | Baggerman | |
| 11,216,314 B2 | 1/2022 | Harwood | |
| 2008/0059610 A1 | 3/2008 | Lin | |
| 2011/0138147 A1 | 6/2011 | Knowles | |
| 2012/0260019 A1 | 10/2012 | Malaiyandisamy | |
| 2013/0055091 A1* | 2/2013 | Dutta | G06F 3/04842 715/736 |
| 2013/0263120 A1 | 10/2013 | Patil et al. | |
| 2013/0268672 A1* | 10/2013 | Justafort | H04L 67/10 709/226 |
| 2014/0237111 A1 | 8/2014 | McMurry | |
| 2015/0242234 A1 | 8/2015 | Harris | |
| 2015/0248305 A1 | 9/2015 | Shu et al. | |
| 2015/0296006 A1 | 10/2015 | Pell | |
| 2015/0317187 A1 | 11/2015 | Hopmann et al. | |
| 2016/0055024 A1 | 2/2016 | Apte et al. | |
| 2016/0321091 A1 | 11/2016 | Cropper et al. | |
| 2017/0068557 A1 | 3/2017 | Cropper et al. | |
| 2019/0139185 A1 | 5/2019 | Baggerman | |
| 2019/0205174 A1 | 7/2019 | Phelan | |
| 2019/0280933 A1 | 9/2019 | Shah et al. | |
| 2020/0142753 A1 | 5/2020 | Harwood | |
| 2022/0150122 A1* | 5/2022 | Suwi | H04L 41/0873 |

OTHER PUBLICATIONS

Tantawi et al., "Provisional Resource Scheduling in a Cloud Computing Environment", U.S. Appl. No. 18/062,182, filed Dec. 6, 2022, 64 pages.

IBM Appendix P, list of IBM patents and patent applications treated as related, 2 pages.

"Patent Cooperation Treaty PCT Notification of Transmittal of the International Search Report and the Written Opinion of the International Searching Authority, or the Declaration", Applicant's file reference F23W4434, International application No. PCT/CN2023/108025, International filing date Jul. 19, 2023, Date of mailing Oct. 24, 2023, 7 pages.

Amazon Web Services, "HPC Workshop", www.hpcworkshops.com, Aug. 7, 2020, 262 pgs.

David Lesaint et al., "Dynamic Workforce Scheduling for British Telecommunications plc", Interfaces 30: 1, Jan.-Feb. 2000, pp. 45-56.

Di Natale et al., "A Massively Parallel Infrastructure for Adaptive Multiscale Simulations: Modeling RAS Initiation Pathway for Cancer", Nov. 17-22, 2019, 16 pgs.

Don Perugini et al., "Provisional Agreement Protocol for Global Transportation Scheduling", Basel, 2005, pp. 17-32.

Oliver Sinnen et al., "Toward a Realistic Task Scheduling Model", IEEE Transactions on Parallel and Distributed Systems, vol. 17, No. 3, Mar. 2006, pp. 263-275.

Stefan Wirag, "Adaptive Scheduling of Multimedia Documents", Springer, 1999, 22 pages.

* cited by examiner

RESOURCE TOPOLOGY GENERATION FOR COMPUTER SYSTEMS

FIELD

The present invention relates generally to computer systems, and more particularly, to resource topology generation for computer systems.

BACKGROUND

Enterprise organizations nowadays are increasingly relying on cloud-based infrastructure, platforms, and applications to deliver critical capabilities and services to the organization and its customers. Cloud computing helps IT organizations operate more efficiently, by reducing up-front capital costs while providing flexible capacity for data storage, processing, and other functions.

Effective management of cloud-based resources is a growing challenge for enterprises of all sizes, as organizations migrate existing applications to the cloud and develop new capabilities that depend on cloud-based infrastructure. Cloud orchestration is a class of software tools designed to help allocate resources, such as containers, virtual machines, and other resources to specific execution tasks, to enable on-demand resource allocation.

SUMMARY

In one embodiment, there is provided, a computer-implemented method for scheduling a set of computing resources, wherein an organizational structure of the computing resources is represented by a physical topology, comprising: receiving an allocation request for a virtual cluster, wherein the virtual cluster comprises a plurality of virtual server instances, and wherein the allocation request includes at least one placement constraint; identifying at least one physical computing resource from the physical topology for allocating the virtual cluster; and constructing a virtual topology of the virtual cluster, wherein the virtual topology is a synchronized subgraph of the physical topology; and providing placement information for the plurality of virtual server instances, based on the virtual topology and the at least one placement constraint.

In another embodiment, there is provided an electronic computation device comprising: a processor; a memory coupled to the processor, the memory containing instructions, that when executed by the processor, schedule a set of computing resources, wherein an organizational structure of the computing resources is represented by a set of physical computing resources arranged in a physical topology, and the instructions cause the electronic computation device to: receive an allocation request for a virtual cluster, wherein the virtual cluster comprises a plurality of virtual server instances, and wherein the allocation request includes at least one placement constraint; identify at least one physical computing resource from the physical topology for allocating the virtual cluster; construct a virtual topology of the virtual cluster, wherein the virtual topology is a synchronized subgraph of the physical topology; and providing placement information for the plurality of virtual server instances, based on the virtual topology and the at least one placement constraint.

In another embodiment, there is provided a computer program product for an electronic computation device comprising a computer readable storage medium having program instructions embodied therewith, the program instructions executable by a processor to cause the electronic computation device to: receive an allocation request for a virtual cluster, wherein the virtual cluster comprises a plurality of virtual server instances, and wherein the allocation request includes at least one placement constraint; identify at least one physical computing resource from a physical topology for allocating the virtual cluster; construct a virtual topology of the virtual cluster, wherein the virtual topology is a synchronized subgraph of the physical topology; and provide placement information for the plurality of virtual server instances, based on the virtual topology and the at least one placement constraint.

Figure 1:
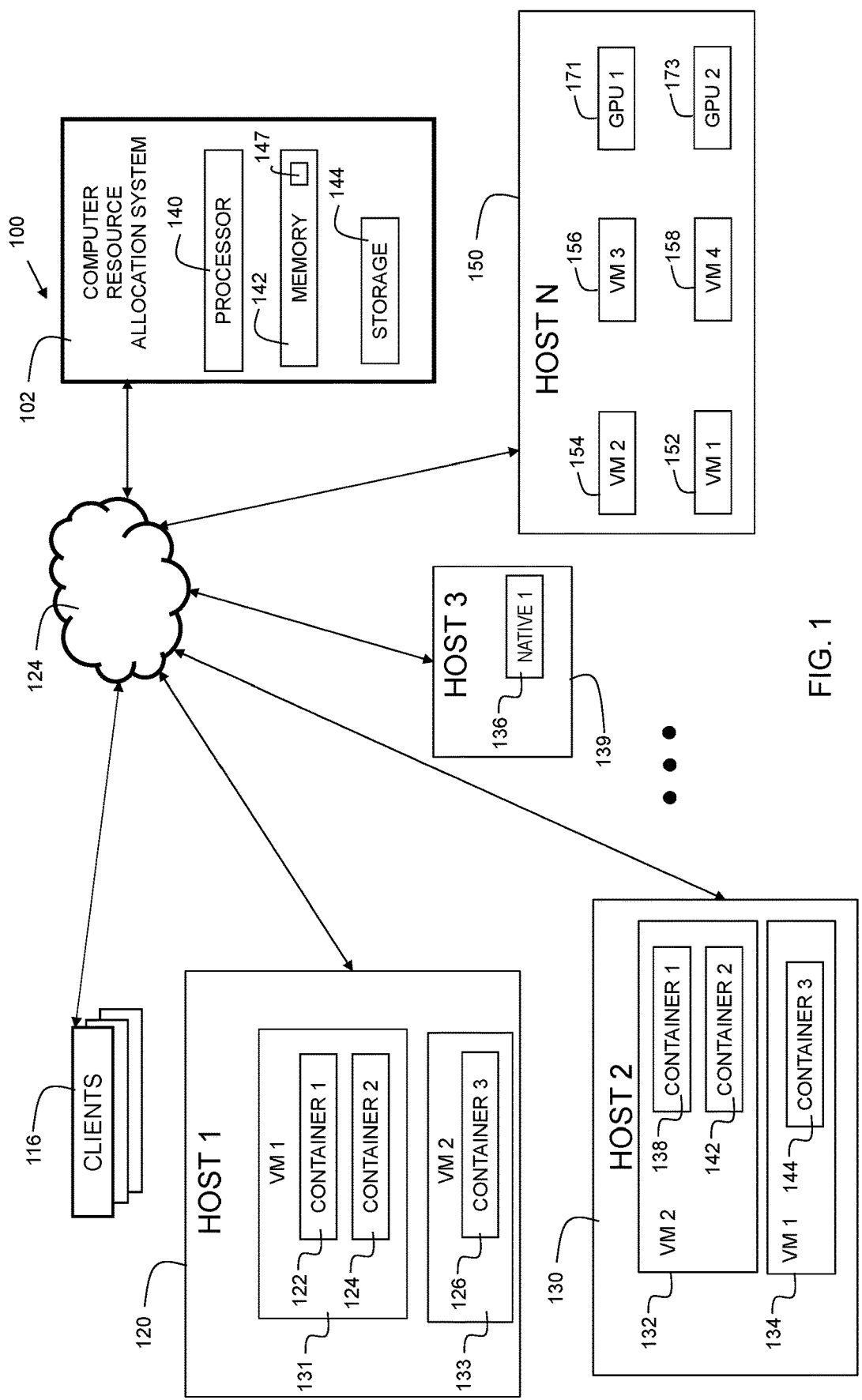
FIG. 1 shows an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for scheduling a set of computing resources, in which an organizational structure of the computing resources is represented by a physical topology. The techniques include receiving an allocation request for a virtual cluster, identifying one or more physical computing resources from the physical topology for allocating the virtual cluster, and constructing a virtual topology of the virtual cluster, wherein the virtual topology is a synchronized subgraph of the physical topology.

Applications may be subject to performance degradation if tasks/processes are not correctly placed. As an example, when users/customers deploy virtual private clouds (VPC), they can run a wide variety of applications. If the applications are performance sensitive, it can be beneficial to have knowledge about where the virtual server instances (VSI) in the VPC are actually placed, so that the users/customers can run their workloads as efficiently as possible.

Placement groups aim at giving the customer the possibility to create the VPC with VSIs placement in mind. Because of multitenancy, it might not be possible for a cloud provider to place the exact number of VSI in the exact way a customer is asking for, therefore sub-optimal solutions must be found. Given that the placement might be sub-optimal, it is even more important for the customer to actually know how the VSIs have been placed, in order to plan how to run their workload in the most efficient mode possible. Embodiments can include providing placement information for the plurality of virtual server instances, based on the virtual topology and the at least one placement constraint. The placement information can be used to enable applications to run more efficiently by taking advantage of affinity within the virtual clusters. Jobs and tasks that benefit from affinity can be scheduled on the best-suited virtual instances, based on the provided placement information.

Disclosed embodiments provide a virtual topology in response to an allocation request. The virtual topology is a synchronized subgraph of the physical topology. The virtual topology synchronized subgraph mirrors the physical topology in terms of tree structure. As an example, if the physical topology includes 6 servers in use on a first rack, and 3 servers in use on a second rack, in order to fulfill an allocation request, then the virtual topology also indicates 6 servers on a first rack, and 3 servers on a second rack. However, merely sharing the physical topology with users/customers is not feasible, as it may reveal additional infrastructure details such as MAC addresses, IP addresses, and the like, that can compromise security and/or jeopardize multi-tenant operations. Disclosed embodiments create virtual topology structures with obfuscated node data, so that important data such as physical IP addresses and/or MAC addresses are hidden from the end-users. The virtual topology is a sub-graph of the physical topology that preserves organizational layers to form a connected topology. Thus, disclosed embodiments provide the benefits of performance enhancement that comes from sharing the topology without the downside of compromising security by revealing physical topology details.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

It is to be understood that although disclosed embodiments can be used in cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 is an environment 100 for embodiments of the present invention. Computer Resource Allocation System (CRAS) 102 comprises a processor 140, a memory 142 coupled to the processor 140, and storage 144. System 102 is an electronic computation device. The memory 142 contains program instructions 147, that when executed by the processor 140, perform processes, techniques, and implementations of disclosed embodiments. Memory 142 may include dynamic random-access memory (DRAM), static random-access memory (SRAM), magnetic storage, and/or a read only memory such as flash, EEPROM, optical storage, or other suitable memory, and should not be construed as being a transitory signal per se. In some embodiments, storage 144 may include one or more magnetic storage devices such as hard disk drives (HDDs). Storage 144 may additionally include one or more solid state drives (SSDs). The CRAS 102 is configured to interact with other elements of environment 100. CRAS 102 is connected to network 124, which is the Internet, a wide area network, a local area network, or other suitable network.

Environment 100 may include one or more client devices, indicated as 116. Client device 116 can include a laptop computer, desktop computer, tablet computer, smartphone, or other suitable computing device. Client device 116 may be used to configure CRAS 102.

Four computers that implement a cluster of nodes are also shown connected to the network. These computers are Host 1 120, Host 2 130, Host 3, 139, and Host N 150. Host 1 120, Host 2 130, Host 3, 139, and Host N 150 are computer systems (host machines) which may include thereon one or more containers, one or more virtual machines (VMs), Graphics Processing Units (GPUs), and/or one or more natively executed applications. These host machines are typically self-sufficient, including a processor (or multiple processors), memory, and instructions thereon. Processors may contain multiple cores. Host 1 120, Host 2 130, Host 3, 139, and Host N 150 are each computers that together implement a cluster.

Host 1 includes instances of three containers: Container 1 122, Container 2 124, and Container 3 126. A container image is a lightweight, stand-alone, executable package of software that includes everything needed to perform a role that includes one or more tasks. The container can include code, runtime libraries, system tools, system libraries, and/or configuration settings. Containerized software operates with some independence regarding the host machine/environment. Thus, containers serve to isolate software from their surroundings. Container 1 122 and container 2 124 are executing within virtual machine 131. Container 3 126 is executing within virtual machine 133.

Host 2 130 includes instances of virtual machines that are executing containers. The containers are Container 1 138, Container 2 142, and Container 3 144. The virtual machines are VM 2 132 and VM 1 134. Container 3 144 is executing within virtual machine 134. Container 1 138 and container 2 142 are executing within virtual machine 132.

Host 3 is executing the native 1 application 136. Application 136 is a native application, operating system, native instruction set, or other native program that is implemented specially for the particular model of the computer or microprocessor, rather than in an emulation or compatibility mode.

Host N includes instances of four virtual machines: VM 2 154, VM 1 152, VM 3 156, and VM 4 158. A virtual machine (VM) is an operating system or application environment that is installed as software, which imitates dedicated hardware. The virtual machine imitates the dedicated hardware, providing the end user with the same experience on the virtual machine as they would have on dedicated hardware.

Host N further includes GPU 1, indicated as 171, and GPU 2, indicated as 173. GPUs are used in a wide range of applications, including graphics and video rendering. GPUs are also becoming more popular for use in creative production and artificial intelligence (AI).

In some embodiments, hosts can include only a single type of environment, such as containers, virtual machines, or native applications. Alternatively, a host can include a plurality of such, like in the example of Host 2. In some cases, instances of the container, virtual machine, or native application may be replicated on more than one host. This is shown here as first instances of Container 1 122, Container 2 124, and Container 3 126 on Host 1 120, and second instances of each are Container 1 138, Container 2 142, and Container 3 144 on Host 2. In addition, first instances of VM 2 132 and VM 1 134 are on Host 2 130, and second instances of VM 2 154 and VM 1 152 are on Host N 150.

The computing resources shown in the example are managed by CRAS 102. CRAS 102 may use one or more programs to deploy, scale, and manage machines and software in the cluster as an orchestration environment. Non-limiting examples of such programs/systems are Kubernetes, Apache Hadoop, and Docker. Applications operating on such a system can include database application such as Oracle database systems utilizing structured query language (SQL) databases. Note that the terms "KUBERNETES, ORACLE, APACHE, HADOOP, and DOCKER" may each be subject to trademark rights in various jurisdictions throughout the world. Each is used here only in reference to the products or services properly denominated by the mark to the extent that such trademark rights may exist.

In embodiments, the CRAS may receive allocation requests for resources. Various attributes and/or metadata can be associated with the allocation request. The attributes can include, but are not limited to, a number of virtual units (VU), an affinity type for one or more levels within the physical topology, and or, virtual unit type. In embodiments, the VU can include, but are not limited to, a virtual machine (VM), container, a Graphics Processing Unit (GPU), and/or native machine (NM). In the native machine, and/or GPU instances, applications may execute on 'bare metal,' without a virtual machine or container, but instead, operate directly on the physical topology hardware. In embodiments, computing resources include at least one of: a virtual machine, a container, a native machine, and a graphics processing unit (GPU).

In some embodiments, the allocation request may include a flexibility attribute. In embodiments, the flexibility attribute can have a value of hard or soft. The value of hard indicates that the request must be fulfilled as specified in order to be accepted. As an example, if an allocation request specified four virtual units with rack level pack affinity, and hard flexibility, then that requirement must be satisfied for the request to be accepted. Conversely, if an allocation request specified four virtual units with rack level pack affinity, and soft flexibility, then a sub-optimal request may be accepted. With soft flexibility, an actual allocation with three virtual units with rack level pack affinity and one virtual unit on another rack may be accepted, even when the allocation request specified four virtual units with rack level pack affinity.

Figure 2:
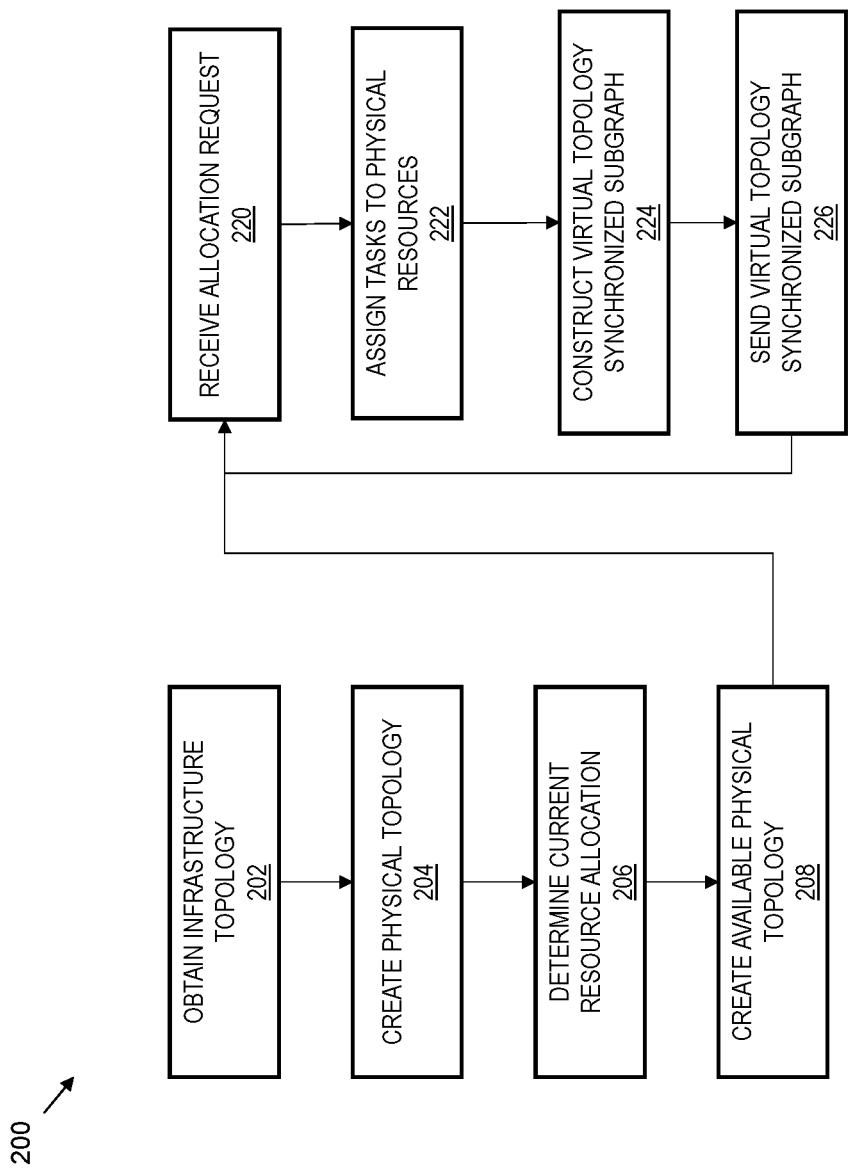
FIG. 2 shows a flowchart for embodiments of the present invention.

FIG. 2 shows a flowchart 200 for embodiments of the present invention. At 202, the infrastructure topology is obtained. This can include querying physical infrastructure via SNMP or other suitable management protocol to determine available computer resources. At 204 a physical topology is created. This can include denoting each level of hierarchy for a given resource, such as room, rack, server, and the like. At 206, a current resource allocation is determined. This can include querying resources via SNMP and/or other APIs to determine utilization of a given computer resource. At 208, an available physical topology is created. The available physical topology can be based on the topology obtained at 202, but with resource counters modified to indicate free resources. Steps 202-208 are preprocessing steps that may be executed prior to receiving an allocation request.

At 220 an allocation request is received. The allocation request can include placement constraints, level constraints, affinity settings, and flexibility options, VU quantity, and other information. Other constraints may be included in the allocation request. Additional constraints could be related to performance and resource disparities, e.g., to schedule on nodes with different types of CPUs, memory, accelerators, and bandwidth, etc. Other constraints can include software licensing terms, e.g., for applications where only certain types of nodes, or parts of the infrastructure, are eligible to run a certain software package.

At 222 tasks are assigned to physical resources. These can include servers, GPUs, and/or specific cores within a server. At 224, a virtual topology synchronized subgraph is constructed. The virtual topology synchronized subgraph is a virtual topology that mirrors a physical topology in terms of affinity, and overall tree hierarchy. At 226, the virtual topology synchronized subgraph is sent to the requestor. In embodiments, the virtual topology synchronized subgraph is sent as a graph description language file, such as a DOT language file, or other suitable representation for a tree topology. The requestor may accept or reject the request. The requestor may utilize the virtual topology synchronized subgraph in order to make optimizations in execution. For example, knowing that a set of n compute nodes are closer to each other from a network point of view, those n compute nodes might be a better fit for a latency-sensitive application. Thus, disclosed embodiments improve the technical field of computing by enabling optimization for latency-sensitive applications, thereby reducing execution time, and conserving computer resources.

Figure 3:
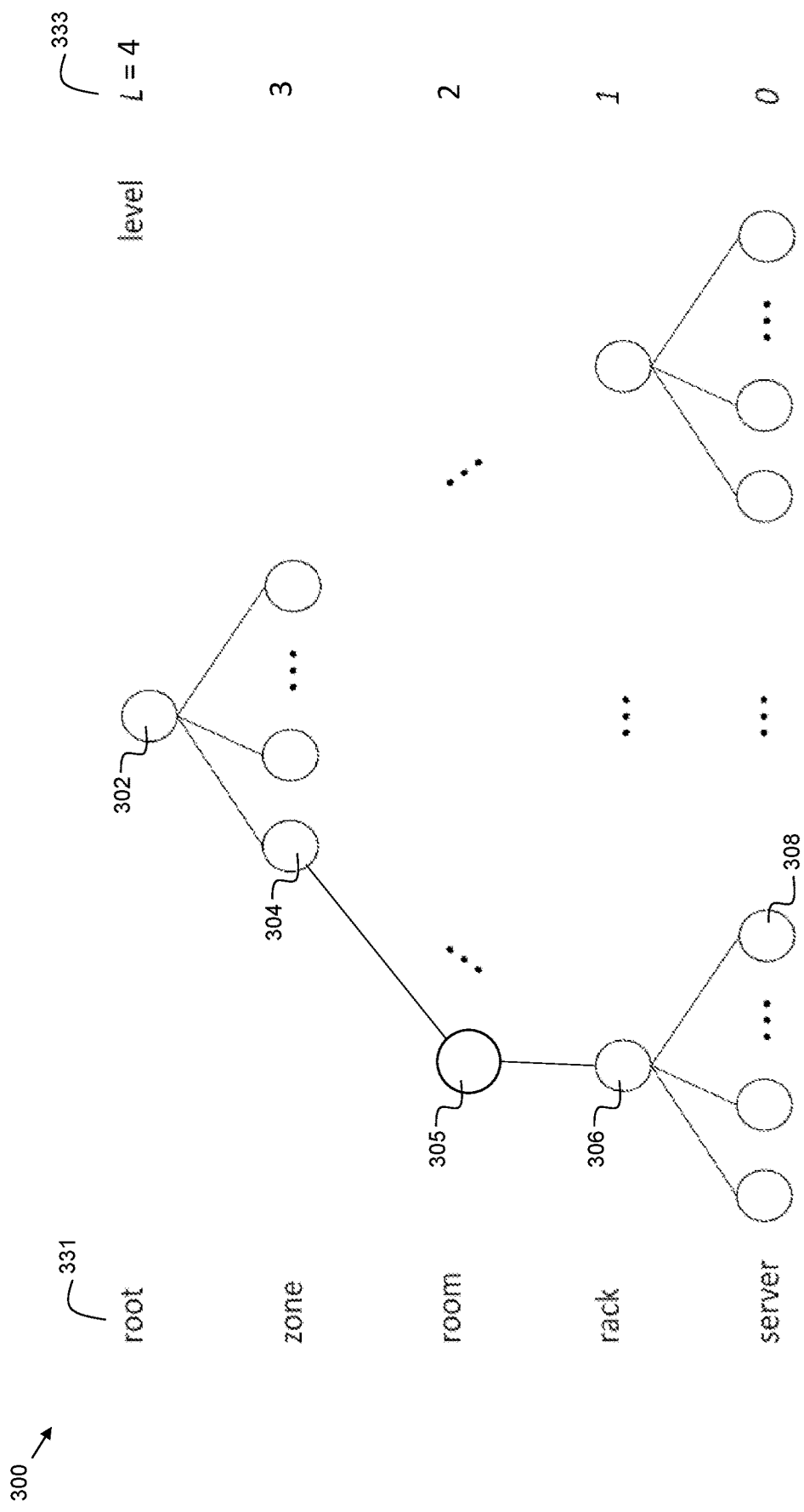
FIG. 3 shows a tree structure for physical topology in accordance with embodiments of the present invention.

FIG. 3 shows a tree structure 300 for physical topology in accordance with embodiments of the present invention. Tree structure 300 has levels indicated by column 331. Column 333 indicates an ordinal number assigned to each level. In general, the highest level is indicated as root. Below root at level 4 is a zone at level 3. A zone can be a geographical region, a specific datacenter, or other region that contains multiple computing resources. Below zone at level 3 is a room at level 2. In embodiments, the room level can represent a specific room or section of a datacenter. Below room at level 2 is a rack at level 1. The rack can represent a specific rack within a datacenter. The rack can be an open frame structure or cabinet. In embodiments, the rack is sized to contain standard sized 19-inch rack-mountable equipment, utilizing a standard rack unit (RU) of 1.75 inches. In some embodiments, the rack has a height of 42 RU, which is 73.5 inches. Below rack at level 1 is a server at level 0. The server represents a physical computing device installed in a rack. The server contains one or more processors. The server may execute applications directly on its one or more processors. The server may execute applications within virtual machines and/or containers running on the server. While five levels are shown in the tree structure 300, other embodiments may include more, fewer, and/or different levels. For example, some embodiments may include a level −1, representing cores within a server. The physical topology can be arranged with a sufficient number of levels to provide the appropriate granularity for scheduling of computing tasks.

Figure 4:
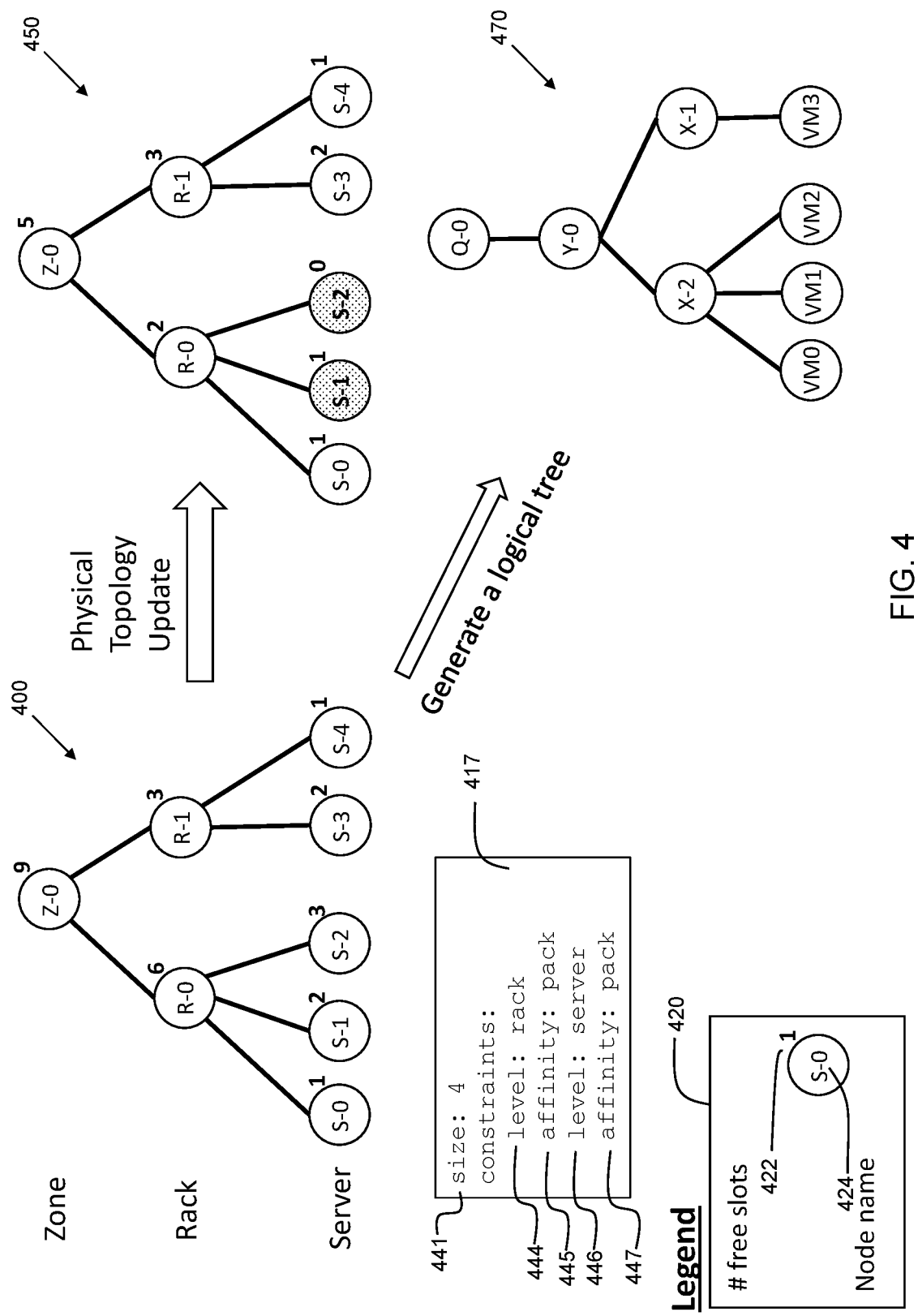
FIG. 4 shows a tree structure for virtual topology in accordance with embodiments of the present invention.

FIG. 4 shows a tree structure for virtual topology in accordance with embodiments of the present invention. The tree structures depicted in FIG. 4 are best understood with reference to the legend 420. Nodes of the tree structures are represented as circles. A node name 424 is indicated inside of each circle. The number of free resources (slots) 422 within a particular node are indicated with a number oriented near the upper right side of the circle.

Tree structure 400 represents a physical topology. The physical topology represents the amount of available physical resources. As can be seen from tree structure 400, zone Z-0 includes 9 computing resources (slots), which are contained within rack R-0 and rack R-1. Rack R-0 contains 6 computing resources. Rack R-1 contains 3 computing resources. Rack R-0 includes three servers, indicated as server S-0, S-1, and S-2. Server S-0 has one computing resource, server S-2 has two computing resources, and server S-3 has three computing resources. Referring now to rack R-1, server S-3 has two computing resources, and server S-4 has one computing resource (slot). In embodiments, the slot refers to an amount of available CPU cycles, memory, and/or other computing resources required to support a virtual unit, such as a virtual machine, container, or the like.

Disclosed embodiments create an updated physical topology, as well as a virtual topology synchronized subgraph, in response to an allocation request. An example of an allocation request for a virtual cluster is depicted at 417. The allocation request 417 can include a size field at 441, indicating the number of computing resources (VU) requested. Embodiments assign one VU to a slot to satisfy the allocation request. Thus, in embodiments, there is a one-to-one relationship between a virtual unit and a slot.

The allocation request 417 can include a level field at 444, indicating a level for which constraints apply to. In the example shown in FIG. 4, the level indicated in field 444 is rack. The allocation request 417 can include an affinity at field 445, that pertains to the level specified in field 444. In the example shown in FIG. 4, the affinity at field 445 is set to pack, indicating a pack affinity at the rack level. The allocation request 417 can include another level field at 446, indicating a level for which constraints apply to. In the example shown in FIG. 4, the level indicated in field 446 is server. The allocation request 417 can include an affinity at field 447, that pertains to the level specified in field 446. In the example shown in FIG. 4, the affinity at field 447 is set to pack, indicating a pack affinity at the server level. While the example allocation request 417 shown in FIG. 4 indicates constraints for two levels, in practice, constraints for more or fewer levels may be present. In embodiments, placement constraint is defined as a set of level constraints, and may include either spread or pack policy at a specific level.

Pack affinity implies that it is desirable for the computing resources to be as close to each other as possible. In some cases, this can be for performance reasons, such as minimizing latency in communication and data sharing between the computing resources. In embodiments, for processing a pack affinity request, algorithms implemented by the CRAS 102 (FIG. 1) traverse the nodes of tree structure 400 in order of most available resources. In the example of FIG. 4, this is represented at node S-2 in tree structure 400, which has three available slots. The size at 441 specifies 4 resources. The CRAS allocates the three available slots on S-2. One resource from the request still needs to be placed. The CRAS then identifies the next node with the most available resources, which is S-1 with two resources. The CRAS allocates one of those resources to the request. The CRAS then creates an updated physical topology at 450.

Referring now to tree 450, the root Z-0 now indicates 5 available slots, rack R-0 indicates 2 available slots. Servers S-1 and S-2 are rendered in shaded circles, indicating placement of the requested computing resources. Server S-1 shows 1 available slot, and server S-2 shows zero available slots, based on satisfying the allocation request 417.

The CRAS 102 (FIG. 1) then generates a virtual topology synchronized subgraph 470. The virtual topology synchronized subgraph 470 mirrors the topology of allocated resources shown in tree 450, with obfuscated node data. Referring now to tree 450, node Q-0 represents a zone, similar to zone Z-0. Node Y-0 represents a rack, similar to rack R-0. Server X-1 represents a server, similar to server S-1 in tree 450. Server X-2 represents a server, similar to server S-2 in tree 450. Node data can be obfuscated to avoid revealing proprietary information regarding the physical computing resources. As an example, MAC addresses may be changed or redacted to avoid revealing details about vendor equipment, IP addresses may be changed or redacted to avoid revealing details about location, and/or other information that may adversely impact cybersecurity. In this way, the underlying topology is provided to requestors, without revealing proprietary details. This provides the requestor with the opportunity to optimize a job or program for execution on the provided resources. As an example, processes that share large amounts of data with each other can be deployed on virtual machines VM0, VM1, and VM2, whereas other processes that are less I/O intensive can be deployed on VM3. In this way, the overall performance of program execution can be improved using disclosed embodiments of the present invention.

In embodiments, the allocation request includes one or more placement constraints. In embodiments, the one or more placement constraints includes affinity. In embodiments, the one or more placement constraints includes a rack level constraint. In embodiments, the one or more placement constraints includes a server level constraint. In embodiments, the virtual topology contains obfuscated node data. In embodiments, the virtual topology is generated by processing nodes in order of most available resources. In embodiments, the at least one placement constraint includes a room level constraint. In embodiments, the at least one placement constraint includes a zone level constraint. The zone level constraint can be useful in certain applications such as financial applications, that benefit from low latency based on servers physically located in a particular region.

Figure 5:
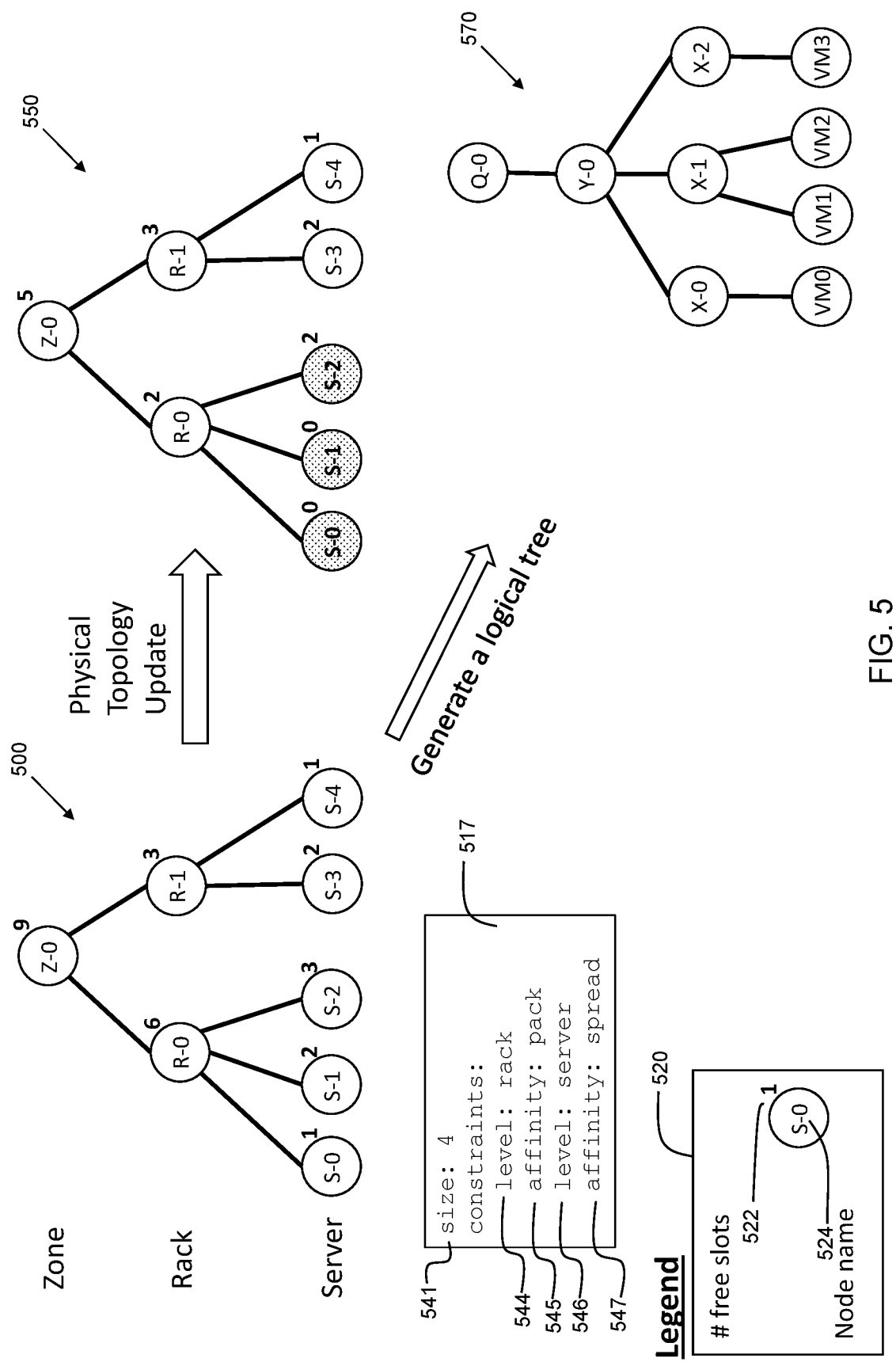
FIG. 5 shows a tree structure for virtual topology in accordance with additional embodiments of the present invention.

FIG. 5 shows a tree structure for virtual topology in accordance with additional embodiments of the present invention. The tree structures depicted in FIG. 5 are best understood with reference to the legend 520. Nodes of the tree structures are represented as circles. A node name 524 is indicated inside of each circle. The number of free resources (slots) 522 within a particular node are indicated with a number oriented near the upper right side of the circle.

Tree structure 500 represents a physical topology. The physical topology represents the amount of available physical resources. As can be seen from tree structure 500, zone Z-0 includes 9 computing resources (slots), which are contained within rack R-0 and rack R-1. Rack R-0 contains 6 computing resources. Rack R-1 contains 3 servers. Rack R-0 includes three servers, indicated as server S-0, S-1, and S-2. Server S-0 has one computing resource, server S-2 has two computing resources, and server S-3 has three computing resources. Referring now to rack R-1, server S-3 has two computing resources, and server S-4 has one computing resource.

Disclosed embodiments create an updated physical topology, as well as a virtual topology synchronized subgraph, in response to an allocation request. An example of an allocation request for a virtual cluster is depicted at 517. The allocation request 517 can include a size field at 541, indicating the number of computing resources (VU) requested. The allocation request 517 can include a level field at 544, indicating a level for which constraints apply to. In the example shown in FIG. 5, the level indicated in field 544 is rack. The allocation request 517 can include an affinity at field 545, that pertains to the level specified in field 544. In the example shown in FIG. 5, the affinity at field 545 is set to pack, indicating a pack affinity at the rack level. This implies that it is desired to run all processes of the request 517 within the same rack. A flexibility parameter of hard or soft can be used to determine if a suboptimal allocation is acceptable. In general, this is application-dependent and selected by the requestor based on application context.

The allocation request 517 can include another level field at 546, indicating a level for which constraints apply to. In the example shown in FIG. 5, the level indicated in field 546 is server. The allocation request 517 can include an affinity at field 547, that pertains to the level specified in field 546. In the example shown in FIG. 5, the affinity at field 547 is set to spread, indicating a spread affinity at the server level.

In this disclosure, spread affinity may also be referred to as anti-affinity. While the example allocation request 517 shown in FIG. 5 indicates constraints for two levels, in practice, constraints for more or fewer levels may be present.

Spread affinity implies that it is desirable for the computing resources to be as distributed as possible within the specified level. In some cases, this can be for redundancy reasons, such as continuing operation if one server should fail. In embodiments, for processing a server affinity request, algorithms implemented by the CRAS 102 (FIG. 1) traverse the nodes of tree structure 500 in order of least available resources. In the example of FIG. 5, this is represented at node S-0 in tree structure 500, which has one available slot. The size at 541 specifies 4 resources. The CRAS places the first resource on server S-0. Three resources from the request still need to be placed. The CRAS then identifies the next node with the least available resources, which is S-1 with two resources. The CRAS allocates two of those resources to the request. The CRAS then identifies the next node with the least available resources, which is S-2 with 3 resources. The CRAS allocates one of those resources to the request. The CRAS then creates an updated physical topology at 450.

Referring now to tree 550, the root Z-0 now indicates 5 available slots, rack R-0 indicates 2 available slots. Servers S-0, S-1, and S-2 are rendered in shaded circles, indicating placement of the requested computing resources. Server S-0 and server S-1 shows zero available slots, and server S-2 shows two available slots, based on satisfying the allocation request 517.

The CRAS 102 (FIG. 1) then generates a virtual topology synchronized subgraph 570. The virtual topology synchronized subgraph 570 mirrors the topology of allocated resources shown in tree 550, with obfuscated node data. Referring now to tree 550, node Q-0 represents a zone, similar to zone Z-0. Node Y-0 represents a rack, similar to rack R-0. Server X-0 represents a server, similar to server S-0 in tree 550. Server X-1 represents a server, similar to server S-1 in tree 550. Server X-2 represents a server, similar to server S-2 in tree 550. Node data can be obfuscated to avoid revealing proprietary information regarding the physical computing resources. As an example, MAC addresses may be changed or redacted to avoid revealing details about vendor equipment, IP addresses may be changed or redacted to avoid revealing details about location, and/or other information that may adversely impact cybersecurity. In this way, the underlying topology is provided to requestors, without revealing proprietary details. This provides the requestor with the opportunity to optimize a job or program for execution on the provided resources. As an example, processes that warrant redundancy can be deployed on virtual machines VM0, VM1, and VM3, which are all hosted on different physical servers, whereas other processes that do not have redundancy requirements can be deployed on VM2. In this way, the overall robustness and availability of a program or service can be improved using disclosed embodiments of the present invention. In embodiments, the one or more placement constraints includes anti-affinity. In embodiments, the virtual topology is generated by processing nodes in order of least available resources.

Comparing virtual topology synchronized subgraph 570 of FIG. 5 with virtual topology synchronized subgraph 470 of FIG. 4, it can be seen that in virtual topology synchronized subgraph 470, with pack affinity at the server level, the four virtual machines VM0-VM3 are distributed amongst two servers, indicated as X-1 and X-2. In contrast, with virtual topology synchronized subgraph 570 of FIG. 5, which utilizes spread affinity (anti-affinity) at the server level, it can be seen that the four virtual machines VM0-VM3 are distributed amongst three servers, indicated as X-1, X-2, and X-3.

As can now be appreciated, disclosed embodiments provide improvements in the technical field of computer systems, and particularly in the allocation of computer resources. Disclosed embodiments can process a request for a virtual cluster of resources, where the virtual cluster includes multiple resources. The resources can include, but are not limited to, virtual machines, containers, GPUs, virtual GPUs, and/or other resources. Furthermore, disclosed embodiments provide a specific sorting mechanism that determines the order of visitation of descendent subtrees for placement, based on affinity or anti-affinity constraints within an allocation request. Disclosed embodiments generate and return a virtual topology of the placed (or to be placed) virtual resources. This feature is particularly important since it can be shared with certain users to allow optimization of the execution of their workloads/applications based on the virtual topology. The virtual topology is based on a hierarchical representation of the physical system. Additionally, disclosed embodiments support both hard and soft constraints. Thus, disclosed embodiments enable more efficient use of computer resources, thereby improving overall system utilization and efficiency.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for scheduling a set of computing resources, wherein an organizational structure of the computing resources is represented by a physical topology, comprising:
   receiving an allocation request for a virtual cluster, wherein the virtual cluster comprises a plurality of virtual server instances, and wherein the allocation request includes at least one placement constraint;
   identifying at least one physical computing resource from the physical topology for allocating the virtual cluster;
   constructing a virtual topology of the virtual cluster, wherein the virtual topology is a synchronized subgraph of the physical topology, and wherein the virtual topology is generated by processing nodes in an order, the order being selected from a group consisting of most available resources and least available resources; and
   providing placement information for the plurality of virtual server instances, based on the virtual topology and the at least one placement constraint.

2. The method of claim 1, wherein the at least one placement constraint includes a room level constraint.

3. The method of claim 1, wherein the at least one placement constraint includes affinity.

4. The method of claim 1, wherein the at least one placement constraint includes anti-affinity.

5. The method of claim 1, wherein the at least one placement constraint includes a rack level constraint.

6. The method of claim 1, wherein the at least one placement constraint includes a server level constraint.

7. The method of claim 1, wherein the virtual topology obfuscates node data.

8. The method of claim 1, wherein the computing resources include at least one of: a virtual machine, a container, a native machine, and a graphics processing unit (GPU).

9. An electronic computation device comprising:
a processor;
a memory coupled to the processor, the memory containing instructions, that when executed by the processor, schedule a set of computing resources, wherein an organizational structure of the computing resources is represented by a set of physical computing resources arranged in a physical topology, and the instructions cause the electronic computation device to:
receive an allocation request for a virtual cluster, wherein the virtual cluster comprises a plurality of virtual server instances, and wherein the allocation request includes at least one placement constraint;
identify at least one physical computing resource from the physical topology for allocating the virtual cluster;
construct a virtual topology of the virtual cluster, wherein the virtual topology is a synchronized subgraph of the physical topology, and wherein the virtual topology is generated by processing nodes in an order, the order being selected from a group consisting of most available resources and least available resources; and
provide placement information for the plurality of virtual server instances, based on the virtual topology and the at least one placement constraint.

10. The electronic computation device of claim 9, wherein the at least one placement constraint includes a room level constraint.

11. The electronic computation device of claim 9, wherein the at least one placement constraint includes affinity.

12. The electronic computation device of claim 9, wherein the at least one placement constraint includes anti-affinity.

13. The electronic computation device of claim 9, wherein the at least one placement constraint includes a rack level constraint.

14. The electronic computation device of claim 9, wherein the at least one placement constraint includes a server level constraint.

15. A computer program product for an electronic computation device comprising a computer readable storage medium having program instructions embodied therewith, the program instructions executable by a processor to cause the electronic computation device to:
receive an allocation request for a virtual cluster, wherein the virtual cluster comprises a plurality of virtual server instances, and wherein the allocation request includes at least one placement constraint;
identify at least one physical computing resource from a physical topology for allocating the virtual cluster;
construct a virtual topology of the virtual cluster, wherein the virtual topology is a synchronized subgraph of the physical topology, and wherein the virtual topology is generated by processing nodes in an order, the order being selected from a group consisting of most available resources and least available resources; and
provide placement information for the plurality of virtual server instances, based on the virtual topology and the at least one placement constraint.

* * * * *